US007290182B2

(12) United States Patent
Windl

(10) Patent No.: US 7,290,182 B2
(45) Date of Patent: Oct. 30, 2007

(54) SOFTWARE TOOL FOR MONITORING FAULTS IN AN AUTOMATION DEVICE

(75) Inventor: Helmut Windl, Bad Abbach (DE)

(73) Assignee: Siemens AG, Munich (DE)

( * ) Notice: Subject to any disclaimer, the term of this patent is extended or adjusted under 35 U.S.C. 154(b) by 497 days.

(21) Appl. No.: 10/431,614

(22) Filed: May 8, 2003

(65) Prior Publication Data

US 2004/0073854 A1    Apr. 15, 2004

Related U.S. Application Data

(63) Continuation of application No. PCT/DE01/04066, filed on Oct. 26, 2001.

(30) Foreign Application Priority Data

Nov. 8, 2000   (DE) ............................. 100 55 250

(51) Int. Cl.
G06F 11/00   (2006.01)
(52) U.S. Cl. .......................................... 714/57; 714/44
(58) Field of Classification Search ................ 714/44, 714/57
See application file for complete search history.

(56) References Cited

U.S. PATENT DOCUMENTS

| | | | | |
|---|---|---|---|---|
| 5,226,120 A | * | 7/1993 | Brown et al. ................ | 709/224 |
| 5,305,437 A | * | 4/1994 | Fritze et al. ................. | 345/520 |
| 5,471,399 A | * | 11/1995 | Tanaka et al. ............... | 716/11 |
| 5,819,028 A | * | 10/1998 | Manghirmalani et al. ..... | 714/57 |
| 5,850,539 A | * | 12/1998 | Cook et al. .................. | 703/20 |
| 5,956,665 A | * | 9/1999 | Martinez et al. ............. | 702/188 |
| 5,991,759 A | * | 11/1999 | Knoblock et al. ............ | 707/10 |
| 5,991,897 A | * | 11/1999 | Perugini et al. ............. | 714/27 |
| 6,031,528 A | * | 2/2000 | Langfahl, Jr. ............... | 715/734 |
| 6,088,816 A | * | 7/2000 | Nouri et al. .................. | 714/31 |
| 6,173,422 B1 | * | 1/2001 | Kimura et al. ................ | 714/57 |
| 6,195,095 B1 | * | 2/2001 | Beer et al. ................... | 715/839 |
| 6,229,540 B1 | * | 5/2001 | Tonelli et al. ............... | 715/735 |
| 6,259,678 B1 | * | 7/2001 | Christian et al. ............ | 370/254 |
| 6,269,398 B1 | * | 7/2001 | Leong et al. ................ | 709/224 |
| 6,384,842 B1 | * | 5/2002 | DeKoning et al. ........... | 715/734 |
| 6,415,314 B1 | * | 7/2002 | Fee et al. .................... | 709/201 |
| 6,456,306 B1 | * | 9/2002 | Chin et al. ................... | 715/810 |
| 6,577,325 B1 | * | 6/2003 | Tadokoro et al. ............ | 715/716 |
| 6,654,915 B1 | * | 11/2003 | Lu et al. ........................ | 714/57 |
| 6,664,985 B1 | * | 12/2003 | Bormann et al. ............ | 715/835 |
| 6,839,747 B1 | * | 1/2005 | Blumenau et al. ........... | 709/223 |
| 2002/0054169 A1 | * | 5/2002 | Richardson .................. | 345/854 |

OTHER PUBLICATIONS

The International Engineering Consortium / Tellabs, Element Management Systems (EMSs), Oct. 14, 1999, The International Engineering Consortium, pp. 10,14,15.*
Website referencing Element Management Systems (EMSs) documentation, Arhive.org for Iec.org/Webproforum.org, Oct. 14, 1999.*
M. Feridun, et al, "ANM: Automated Network Management System", IEEE Network, vol. 2, No. 2, Mar. 1988, pp. 13-19.
"Engineering Tools S7-PDIAG", Version Sep. 12, 2000.

* cited by examiner

Primary Examiner—Scott Baderman
Assistant Examiner—Paul F. Contino
(74) Attorney, Agent, or Firm—Sughrue Mion Pllc.

(57) ABSTRACT

A software tool which simplifies the monitoring of faults in an automation device. On a display device (FIG. 3), a rack (0'-3') of this automation device with slots and functional modules is represented in a first view (4) in graphic form and in a second view (9) in tabular form. A faulty slot and/or a faulty functional module is displayed in some manner of highlighted form ((F), 10, 11, etc.).

26 Claims, 3 Drawing Sheets

| Rack 0 | Rack 1 | Rack 2 | Rack 3 | | |
|---|---|---|---|---|---|
| Slot | Module | Order #: E6S7 | E-Adress | A-Adress | Remarks |
| 1' | | | | | |
| 2' | | | | | |
| 3' | | | | | |
| 4' | | | | | |
| 5' | CPU312IFM | | | | |
| 6' | | | | | |
| 7' | | | | | |
| 8' | | | | | |
| 9' | | | | | |
| 10' | | | | | |
| 11' | | | | | |

☑ Show module information

| Module | Order Number |
|---|---|
| ■ CPU 311 | ⊞ ■ 6ES7 311-1DX00-0AB0<br>6kB RAM; 500ms/kAW; MPI port, single-row construction up to 2 BG |
| ■ CPU312IFM | ⊞ ■ 6ES7 312-5AC02-0AB0<br>12kB RAM; 0.6ms/kAW; MPI DI10/D06-integrated; MPI port, single... |
| ■ CPU 313 | ⊞ ■ 6ES7 313-1AD03-0AB0 [V1.1 ▼]<br>12kB RAM; 0.6ms/kAW; MPI port, single-row construction up to 8 BG |
| ■ CPU 314 | ⊞ ■ 6ES7 314-1AE04-0AB0<br>24kB RAM; 0.3 ms/kAW; MPI port, multi-row construction up to 32 BG |
| ■ CPU 314IFM | ⊞ ■ 6ES7 314-5AE03-0AB0<br>24kB RAM; 0.3 ms/kAW; MPI... |

FIG 2

SOFTWARE TOOL FOR MONITORING FAULTS IN AN AUTOMATION DEVICE

This is a Continuation of International Application PCT/DE01/04066, with an international filing date of Oct. 26, 2001, which was published under PCT Article 21(2) in German, and the disclosure of which is incorporated into this application by reference.

FIELD OF AND BACKGROUND OF THE INVENTION

The invention relates to a software tool for monitoring faults in an automation device. The invention further relates to a diagnostic system equipped with such a software tool.

The interactive Siemens catalogue entitled "Industrial and Automation Systems," index "SIMATIC PCS7 Process Control System," Version: 09/12/2000 describes a software tool "S7-PDIAG" for configuring process diagnostics for Siemens "SIMATIC S7" automation devices. In addition to the configuration for detecting process faults, the software tool also allows the process faults to be displayed.

OBJECTS OF THE INVENTION

One object of the present invention is to provide a software tool that simplifies the monitoring of faults in an automation device. A further object of the invention is to provide a diagnostic system enabling a simplified monitoring of faults in such an automation device.

SUMMARY OF THE INVENTION

According to one formulation, the invention provides a software tool for monitoring faults in an automation device that has at least one rack and a plurality of functional modules configured for insertion into slots in the rack. The software module generates a first view graphically displaying the rack with the slots and the functional modules on a display unit, a second view displaying the rack with the slots and the functional modules in a tabular form on the display unit, and a fault indicator marking at least one of a faulty slot and a faulty functional module, from among the plurality of functional modules and the slots, in the first view and in the second view.

According to another formulation, the invention encompasses a diagnostic system including: a software tool for monitoring faults in an automation device having at least one rack and a plurality of functional modules for the rack; and a display unit on which: the software tool generates a first view graphically displaying the rack with the slots and the functional modules, the software tool generates a second view displaying the rack with the slots and the functional modules in a tabular form; and the software tool generates a fault indicator marking at least one of a faulty slot and a faulty functional module in the first and in the second view.

The invention, according to yet another formulation, is also directed to a method for displaying a fault in an automation system, which includes: displaying, at least schematically, a rack having a plurality of slots for function modules and at least one function module in a first display view; displaying a table referencing the rack, the slots and the at least one function module in a second display view; and upon occurrence of the fault, altering the first view and the second view to identify which among the plurality of slots and the function module has caused the fault.

It is advantageous that the important information on the automation device can be presented in a clear layout in a first and a second view. The first view includes the physical aspect of the automation device with geographic address information and fault identification, while the second view includes a tabular view with expanded information, e.g., logic address information, information on the module state and on the order numbers of the modules.

In a third view, the software tool displays information on the cause of the fault and ways to correct the fault, so that a user is able rapidly to take the appropriate measures for monitoring and resolving the fault.

In one embodiment of the invention, the software tool generates an assignment arrow on the display unit, which links the selected slot and/or the selected functional module in the first view with that of the second view, showing the first and second view synchronously. This makes it easy to see the assignment of the slots and/or the functional modules in the two views.

In a further embodiment of the invention, in the first view, the software tool shows the rack with the slots and the inserted functional modules according to their actual spatial appearance, i.e. layout, thus providing a simplified man-machine interface.

BRIEF DESCRIPTION OF THE DRAWINGS

The invention and its embodiments and advantages will now be described in greater detail by means of an exemplary embodiment of the invention with reference to the drawing in which FIGS. 1 to 3 show different views of an automation device on a display unit of a programming device, where analogous parts depicted in FIGS. 1 to 3 are provided with the same reference numerals.

DETAILED DESCRIPTION OF THE PREFERRED EMBODIMENTS

A software tool provided for configuring and diagnosing an automation device can be run on a programming device (not shown). The automation device has at least one rack and a plurality of functional modules that can be inserted into this rack. Based on the hardware characteristics of these modules and/or due to the system architecture of the automation device, specific slots in the rack are provided for each of these functional modules. The insertable functional modules can be configured, for example, as CPU modules, communications modules, and digital and/or analog input and/or output modules.

Figure 1:
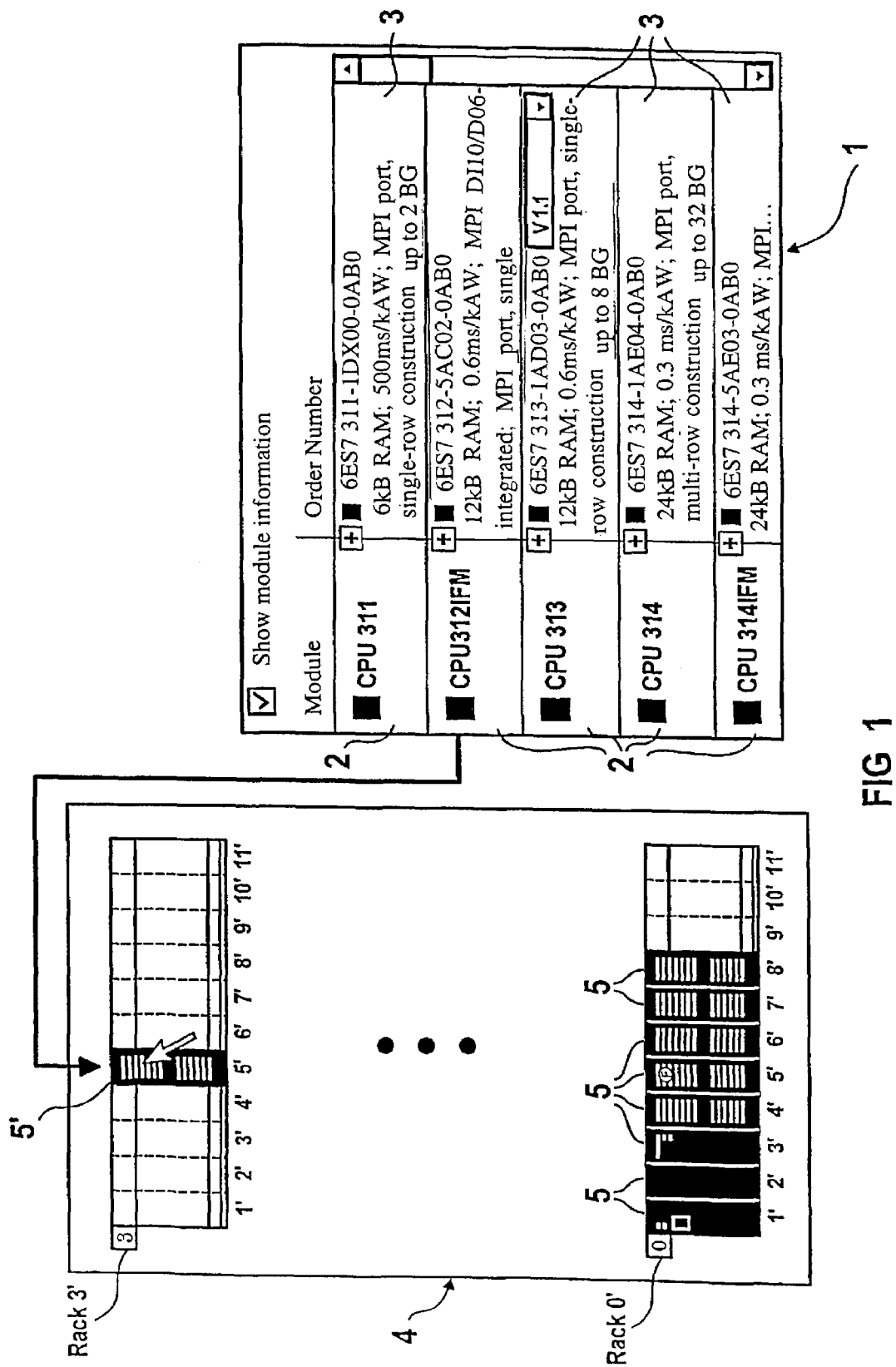

FIG. 1 shows an identification table 1 as it can be displayed by the software tool on a display unit. The identification table 1 includes identifying characteristics of the functional groups, in tabular form, in columns and rows. These identifying characteristics include module names 2 and module properties 3. In the present example, the identification table 1 shows the module properties in the form of order numbers, memory capacities and types of connection. By means of an input and selection unit (not shown here) e.g., in the form of a mouse, a user selects the desired functional module to be operated in the automation device by selecting the corresponding line in the identification table 1. The user then moves the selected functional module into a slot of a rack, which, in a first view of the display unit, is graphically depicted in a viewport 4, by means of an otherwise conventional drag-and-drop operation. With this movement, the functional group selected in the identification table 1 changes its appearance and is now displayed in graphic form. It is also possible to occupy this slot in the viewport 4 by copying the content of the selected line in the identification table 1 instead of moving it, so that the content of the identification table 1 remains unchanged. In the present example, a CPU module identified as CPU3121FM is moved to the slot 5' of the rack 3'. In the racks 0' to 3' of the viewport 4, the software tool shows the slots 1' to 11' into which this module can be generally inserted. The software tool prevents the user from moving a module into a slot of a rack 0' to 3' that is not allowed for that module. Such a drag-and-drop operation will be rejected and an error message will be displayed.

The racks 0 to 3 shown on the display unit in the viewport 4 with the associated slots 1' to 11' and the functional modules 5 moved into the racks 0' to 3' are depicted basically according to their hardware configuration. In other words, on the display unit, the modules are shown generally in accordance with their spatial layout/appearance.

In a second view, as shown in FIG. 2 and in contrast to FIG. 1, the racks 0' to 3' are depicted in the form of register cards 5 to 8, instead of graphically, in a viewport 9. For configuring the automation device, as described above, a user again selects a line in the identification table 1 and in a drag-and-drop operation moves the content of the selected line to one of the register cards 5 to 8. This causes the slots 1' to 11' of the selected register card 5 to 8 to be displayed. In the present example, the register card 5, i.e., the rack 0, is selected, and the slot 5' where the selected CPU module CPU3121FM can be inserted, is marked.

Figure 3:
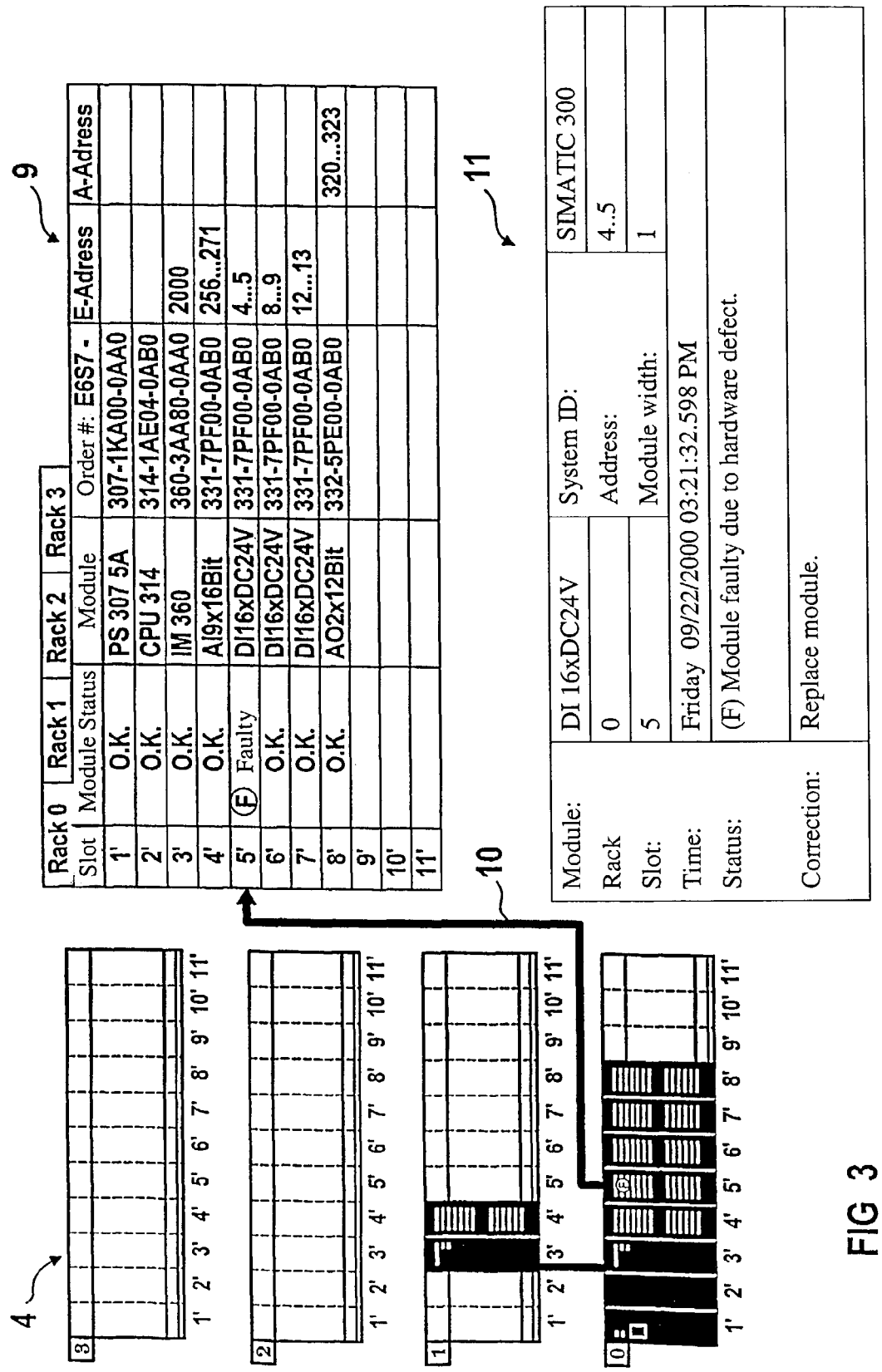

The following description refers to FIG. 3, which depicts a diagnostic view displayed on the display unit of the programming device. To monitor faults in the automation device, the programming device is connected online with the automation device. In this diagnostic view, the automation device is depicted in graphic form in the viewport 4 and in tabular form in the viewport 9. In this diagnostic view, the graphic form contains the physical appearance of the automation device in context, including geographical address information—racks 0' to 3', slots 1' to 11'—as well as fault identifications. The tabular form shows expanded information, e.g., logical address information and module states.

If there is a fault in the automation device, the diagnostic view is automatically activated in the programming device, causing the software tool to display the automation device in graphic and tabular form in the viewports 4 and 9. The software tool preferably displays the two forms synchronously, identifying faulty functional modules (here, by way of example, with (F)) and generating an assignment arrow that links the faulty slot and/or the faulty functional module in the first view with the second view. In the present example, an assignment arrow 10 points to a faulty module inserted into the slot 5' in the graphic view and a slot 5' in the tabular view, so that the user can quickly determine the module in question by means of the content of the line in the table. To enable the user promptly to take the necessary actions in response to the fault, the software tool, in a third view 11, displays information on the cause of the fault, the time when the fault occurred and ways to correct the fault. This view, too, is preferably shown synchronously with the first and the second views by the software tool.

The above description of the preferred embodiments has been given by way of example. From the disclosure given, those skilled in the art will not only understand the present invention and its attendant advantages, but will also find apparent various changes and modifications to the structures and methods disclosed. It is sought, therefore, to cover all such changes and modifications as fall within the spirit and scope of the invention, as defined by the appended claims, and equivalents thereof.

What is claimed is:

1. A computer-readable medium storing a software tool for configuring an automation device and for monitoring faults in the automation device having at least one rack and a plurality of functional modules configured for insertion into slots in the rack, said software tool generating:
   a first view graphically displaying the rack with the slots and the functional modules on a display unit,
   a second view displaying the rack with the slots and the functional modules in a tabular form on the display unit,
   a fault indicator marking at least one of a faulty slot and a faulty functional module, from among the plurality of functional modules and the slots, in the first view and in the second view; and
   an assignment indicator visually linking the at least one faulty slot or faulty functional module in the first view with the same at least one faulty slot or faulty functional module in the second view,
   wherein the software tool allows for insertion of a functional module from the plurality of functional modules into the rack, and
   wherein the location of the faulty component within the rack in the first view and the location of the same faulty component within the rack in the second view are marked and wherein the locations of the marked components are graphically connected.

2. The computer-readable medium storing said software tool as claimed in claim 1, wherein the functional modules are selected from the group consisting of CPU modules, communications modules, digital input modules, digital output modules, analog input modules, and analog output modules.

3. The computer-readable medium storing said software tool as claimed in claim 1, wherein the software tool generates a third view displaying information on a cause of the fault.

4. The computer-readable medium storing said software tool as claimed in claim 1, wherein the software tool generates a third view displaying information on correcting the fault.

5. The computer-readable medium storing said software tool as claimed in claim 1, wherein the software tool displays the first and the second view synchronously together with the assignment indicator.

6. The computer-readable medium storing the software tool as claimed in claim 1, wherein the first view displays the rack and the functional modules in accordance with an actual spatial layout of the rack and the functional modules.

7. The computer-readable medium storing the software tool as claimed in claim 1, wherein the software tool generates a third view displayed together with: the first view, the second view, the fault indicator, and the assignment indicator; and wherein the third view displays information regarding cause of fault, time at which the fault occurred, and techniques to correct the fault.

8. The computer-readable medium storing said software tool as claimed in claim 1, wherein a user designates a slot from the slots of the rack for the insertion of the functional module, and the software tool inserts the functional module into the user-designated slot and wherein the first and second views display a plurality of racks of the automation device, wherein the user selects the functional module and places the selected functional module into the user-designated slot depicted in the second view via drag and drop technique, and wherein the software tool determines whether the selected functional module can be inserted into the user-designated slot.

9. The computer-readable medium storing said software tool as claimed in claim 8, wherein, when the user-designated slot is a disallowed slot for the selected functional module, the software tool prevents the user from moving the functional module into the user-designated slot.

10. The computer-readable medium storing said software tool as claimed in claim 9, wherein the software tool determines whether the insertion into said user-designated slot is allowed based on hardware characteristics of the functional module and based on architecture of the automation device.

11. The computer-readable medium storing said software tool as claimed in claim 1, wherein a user designates a slot from the slots of the rack for the insertion of the functional module, and the software tool inserts the functional module into the user-designated slot and wherein, when the user-designated slot is a disallowed slot for the selected functional module, the software tool prevents the user from moving the functional module into the user-designated slot.

12. The computer-readable medium storing said software tool as claimed in claim 1, wherein a user designates a slot from the slots of the rack for the insertion of the functional module, and the software tool inserts the functional module into the user-designated slot and wherein the software tool determines whether the selected functional module can be inserted into the user-designated slot at a time of said insertion.

13. A system for configuring and diagnosing an automation device, comprising:
a software tool for monitoring faults in the automation device having at least one rack and a plurality of functional modules for the rack and for configuring the automation device; and
a display unit of a computer,
wherein:
the software tool generates a first view graphically displaying the rack with the slots and the functional modules,
the software tool generates a second view displaying the rack with the slots and the functional modules in a tabular form,
the software tool generates a fault indicator marking at least one of a faulty slot and a faulty functional module in the first and in the second view,
the software tool generates an assignment indicator visually linking the at least one faulty slot or faulty functional module in the first view with the same at least one faulty slot or functional module in the second view,
the software tool allows for insertion of a functional module from the plurality of functional modules into the rack, and
wherein the location of the faulty component within the rack in the first view and the location of the same faulty component within the rack in the second view are marked and wherein the locations of the marked components are graphically connected.

14. Diagnostic system as claimed in claim 13, wherein the functional modules are selected from the group consisting of CPU modules, communications modules, digital input modules, digital output modules, analog input modules, and analog output modules.

15. Diagnostic system as claimed in claim 13, wherein the software tool generates a third view displaying information on a cause of the fault.

16. Diagnostic system as claimed in claim 13, wherein the software tool generates a third view displaying information on correcting the fault.

17. Diagnostic system as claimed in claim 13, wherein the software tool synchronously displays on the display the first and the second view together with the fault indicator marking and the assignment indicator.

18. Diagnostic system as claimed in claim 13, wherein the first view displays the rack and the functional modules in accordance with an actual spatial layout of the rack and the functional modules.

19. The diagnostic system as claimed in claim 13, wherein the software tool generates a third view displayed together with: the first view, the second view, the fault indicator, and the assignment indicator, and wherein the third view displays information regarding cause of fault, time at which the fault occurred, and techniques to correct the fault.

20. The system as claimed in claim 13, wherein a user designates a slot from the slots of the rack for the insertion of the functional module, and the software tool inserts the functional mode into the user-designated slot, wherein the software tool determines whether the insertion into the user-designated slot is allowed based on hardware characteristics of the functional module and based on architecture of the automation device.

21. The system as claimed in claim 13, wherein a user designates a slot from the slots of the rack for the insertion of the functional module, and the software tool inserts the functional module into the user-designated slot, wherein the user selects the functional module and places the selected functional module into the user-designated slot depicted in the second view via drag and drop technique, and wherein the software tool determines whether the functional module can be inserted into the user-designated slot of the rack, and wherein, when the functional module is not allowed in the user-designated slot of the rack, the software tool prevents the user from moving the functional module into the user-designated slot of the rack.

22. The system as claimed in claim 13, wherein a user designates a slot from the slots of the rack for the insertion of the functional module, and the software tool inserts functional module into the user-designated slot and wherein, when the user-designated slot is a disallowed slot for the functional module, the software tool prevents the user from moving the functional module into the user-designated slot.

23. The system as claimed in claim 13, wherein a user designates a slot from the slots of the rack for the insertion of the functional module, and the software tool inserts the functional module into the user-designated slot and wherein, at a time of insertion of each functional module, the software tool checks whether the insertion of a selected module is allowed.

24. A method for displaying a fault in an automation system, comprising:
displaying, at least schematically, a rack having a plurality of slots for function modules and at least one function module in a first display view;
displaying a table referencing the rack, the slots and the at least one function module in a second display view; and
upon occurrence of the fault, altering the first display view and the second display view to provide an identification of which component among the plurality of slots and the function module has caused the fault; and visually linking a location of the faulty component in the first view with a location of the same faulty component displayed in the second altered view,
wherein the location of the faulty component within the rack in the first view and the location of the same faulty component within the rack in the second view are marked and wherein the locations of the marked components are graphically connected.

25. The method as claimed in claim 24, further comprising:
displaying additional fault information with respect to the faulty component in a third display view.

26. The method as claimed in claim 25, wherein the third display view is displayed together with the first altered view and with the second altered view, wherein the third view displays information regarding cause of fault, time at which the fault occurred, and techniques to correct the fault, and wherein the faulty component displayed in the first altered view is visually linked with the same faulty component displayed in the second altered via a displayed assignment arrow.

* * * * *